(12) United States Patent
Hemena et al.

(10) Patent No.: US 6,442,052 B1
(45) Date of Patent: Aug. 27, 2002

(54) HIGH EFFICIENCY POWER CONVERTER WITH FAST TRANSIENT RESPONSE

(75) Inventors: William Hemena, Raleigh, NC (US); Thai Quoc Ngo, Rochester; Scott Douglas Strand, Byron, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/943,235

(22) Filed: Aug. 30, 2001

(51) Int. Cl.[7] .......................... H02M 3/24; H02M 7/122
(52) U.S. Cl. ...................................... 363/97; 363/56.12
(58) Field of Search .......................... 363/16, 20, 21.01, 363/21.12, 24, 25, 55, 56.01, 56.06, 56.09, 56.12, 95, 97, 131; 323/222, 223, 225

(56) References Cited

U.S. PATENT DOCUMENTS

| | | |
|---|---|---|
| 4,274,133 A | 6/1981 | Cuk et al. |
| 4,441,146 A | 4/1984 | Vinciarelli |
| 4,674,019 A | 6/1987 | Martinelli |
| 4,686,617 A | 8/1987 | Colton |
| 5,008,795 A | 4/1991 | Parsley et al. |
| 5,130,561 A | 7/1992 | Elliott et al. |
| 5,235,502 A | 8/1993 | Vinciarelli et al. |
| 5,291,382 A | 3/1994 | Cohen |
| 5,434,767 A | 7/1995 | Batarseh et al. |
| 5,471,376 A * | 11/1995 | Tsai et al. ............... 363/20 |
| 5,485,362 A | 1/1996 | Archer |
| 5,636,106 A | 6/1997 | Batarseh et al. |
| 5,654,881 A | 8/1997 | Albrecht et al. |
| 5,691,627 A | 11/1997 | Shum |
| 5,694,302 A | 12/1997 | Faulk |
| 5,781,421 A | 7/1998 | Steigerwald et al. |
| 5,801,932 A * | 9/1998 | Hwang et al. ............ 363/21 |
| RE36,098 E | 2/1999 | Vinciarelli |
| 5,926,383 A | 7/1999 | Pilukaitis et al. |
| 5,946,201 A | 8/1999 | Kim |
| 5,959,438 A | 9/1999 | Jovanovic et al. |
| 5,973,939 A | 10/1999 | Tan |
| 5,978,238 A | 11/1999 | Liu |
| 5,991,171 A | 11/1999 | Cheng |
| 5,999,417 A | 12/1999 | Schlecht |
| 6,088,250 A | 7/2000 | Siri |
| 6,144,565 A | 11/2000 | Lethellier |
| 6,163,467 A | 12/2000 | Kobayashi |

OTHER PUBLICATIONS

U.S. application No. 09/717,622, Hemena et al., filed Nov. 21, 2000.

"Low Output Impedance DC/DC Converter," IBM Technical Disclosure Bulletin, Sep. 1994, vol. 37, No. 9, pp. 671–673.

* cited by examiner

*Primary Examiner*—Matthew Nguyen
(74) *Attorney, Agent, or Firm*—Bracewell & Patterson, L.L.P.

(57) ABSTRACT

A high efficiency power converter and method of operation thereof. The high efficiency power converter includes a preregulator circuit that provides a regulated intermediate DC voltage to a low impedance output stage. The low impedance output stage includes first and second power transformers, where each of the power transformers has first and second primary windings of opposite polarity and a secondary winding. The low impedance output stage also includes first and second switches that alternatively couple the first primary windings of the first and second power transformers, respectively, to the regulated intermediate DC voltage. The low impedance output stage further includes first and second coupling capacitors that couple the second primary windings of the first and second power transformers to the second and first switches, respectively, and are utilized to reset the first and second power transformers with minimum losses.

20 Claims, 2 Drawing Sheets

HIGH EFFICIENCY POWER CONVERTER WITH FAST TRANSIENT RESPONSE

CROSS-REFERENCE TO RELATED PATENT APPLICATION

The present invention is related to the subject matter of co-pending United States Patent Application entitled "HIGH EFFICIENCY DUAL FORWARD POWER CONVERTER," FILED Nov. 21, 2000, Ser. No. 09/717,622 (IBM Docket No. RPS920000065US1), assigned to the assignee herein named. The contents of the above-mentioned patent application are incorporated by reference herein.

BACKGROUND OF THE INVENTION

1. Technical Field:

The present invention relates in general to power conversion and, in particular, to DC/DC power converters having improved topologies that provide high efficiency with low output impedance. More particularly, the present invention relates to a high-efficiency power converter and a method of operation thereof.

2. Description of the Related Art

Regulated DC power supplies are typically needed for most analog and digital electronic systems. Two major categories of regulated DC power supplies are linear power supplies and switching power supplies. Generally, in linear power supplies, a transistor (operating in its active region) is connected in series with an input voltage source and the voltage drop across the transistor is automatically adjusted to maintain an output voltage at a desired level.

In switching power supplies, transformation of DC voltage from one level to another is accomplished typically by means of DC/DC converter circuits, such as step-down (buck) or step-up (boost) converter circuits. Solid-state devices, such as transistors, are operated as switches (either completely ON or completely OFF) within these switching converters. Since the power devices are not required to operate in their active region, this mode of operation results in lower power dissipation. Furthermore, increasing switching speeds, higher voltage and current ratings of these power devices are some of the advantages that have increased the popularity of switching power supplies. It is not uncommon for switching power supplies to have a switching frequencies of 100 kHz or higher. The high switching frequencies permit the components utilized in construction of the power converter, such as capacitors, inductors and transformers, to be physically small. The reduction in the overall volume (size) of the converter that results is desirable to the users of such supplies. Another important attribute of a power supply is its thermal efficiency. The higher the efficiency, the less heat that is dissipated within the supply, and the less design effort, volume, weight, and cost that must be devoted to remove this heat.

Distributed power systems are increasingly being utilized in modern systems, for example, due to different power levels requirements in a power consuming system. Furthermore, with the increasing popularity and utilization of complementary metal oxide semiconductor (CMOS) technologies in present and future projected electronic systems, highly dynamic loading conditions are a common problem encountered by power systems. Highly dynamic loads present unique problems to a supply power system. This is especially true with load systems, such as computer systems, utilizing complementary metal oxide semiconductor (CMOS) technologies. In these systems, it is not uncommon for portions of the load system to switch from ten percent to full load in a few microseconds. This load behavior makes it difficult to maintain the power system bus voltages in regulation. One approach to resolve the widely varying output load swings is to utilize large decoupling capacitors at the load. W This approach provides some load regulation relief, however at low bus voltages, the amount of decoupling required becomes unmanageable. To illustrate, at a given power level, four times as much decoupling is required to maintain a 2.5V bus within a specified percentage tolerance as for a 5V bus. Since electrolytic capacitor impedance is primarily dominated by equivalent series resistance and inductance at high frequencies, and these parameters are determined mostly by case size (independent of the voltage rating of the capacitor), four times as much space must be allocated to decoupling at the lower voltage level as at the higher voltage level.

Accordingly, what is needed in the art is an improve power converter topology that mitigates the limitations in the prior art. More particularly, the highly dynamic loading conditions necessitates a low impedance power distribution network driven by low impedance power supplies.

SUMMARY OF THE INVENTION

To address the above discussed deficiencies in the prior art, and in accordance with the invention as embodied and broadly described herein, a high efficiency power converter is disclosed. The high efficiency power converter includes a preregulator circuit coupled to a low impedance output stage. The preregulator circuit provides a regulated intermediate DC voltage and includes a regulator switching device that is coupled to a source of DC power and a regulator inductor. The low impedance output stage includes first and second power transformers, where each of the power transformers has first and second primary windings of opposite polarity and a secondary winding. The low impedance output stage also includes first and second switches that alternatively couple the first primary windings of the first and second power transformers, respectively, to the regulated intermediate DC power. The first and second switches, in an advantageous embodiment, are Field Effect Transistors (FETs) and are driven in a complementary manner with a duty cycle of about 47% to 49%. The low impedance output stage further includes first and second coupling capacitors that couple the second primary windings of the first and second power transformers to the second and first switches, respectively, and are utilized to reset the first and second power transformers with minimum losses. In a related embodiment, the low impedance output stage also includes third and fourth switches that are coupled to the secondary windings of the second and first power transformers, respectively, and are driven in a substantially identical manner as the second and first switches, respectively.

The present invention discloses a novel high efficiency low output impedance power converter having a preregulator circuit that provides a regulated intermediate voltage to a low impedance output stage. A coupling inductor coupled to an inductor in the preregulator circuit is utilized to provide a means of transferring the remaining energy present in the inductor to an output device, such as an output capacitor, when the switches in the output stage are turned off. This, in turn, will reduce the output ripple current and improve the transient response of the power converter. The present invention also recognizes that the utilization of the coupling capacitors in the output stage, in contrast to prior art power converters employing devices, such as diodes, improves the overall efficiency of the power converter due to their "lossless" nature. The improved efficiency is due to the substantial elimination of energy losses, i.e., thermal energy, that are a consequence when devices such as diodes are utilized. Additionally, unlike diodes, the current can flow from both directions into the coupling capacitors during their charging and discharging cycles, resulting in zero-voltage-switching (ZVS) during the turn ON of the first and second switches. Furthermore, since the coupling capacitors can charge and discharge in both directions, the currents through the first and second switches are the combination of a primary winding current and the current through a coupling capacitor. Consequently, since the coupling capacitors are also contributing to the current flow through the switches, the efficiency of the power converter is improved.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
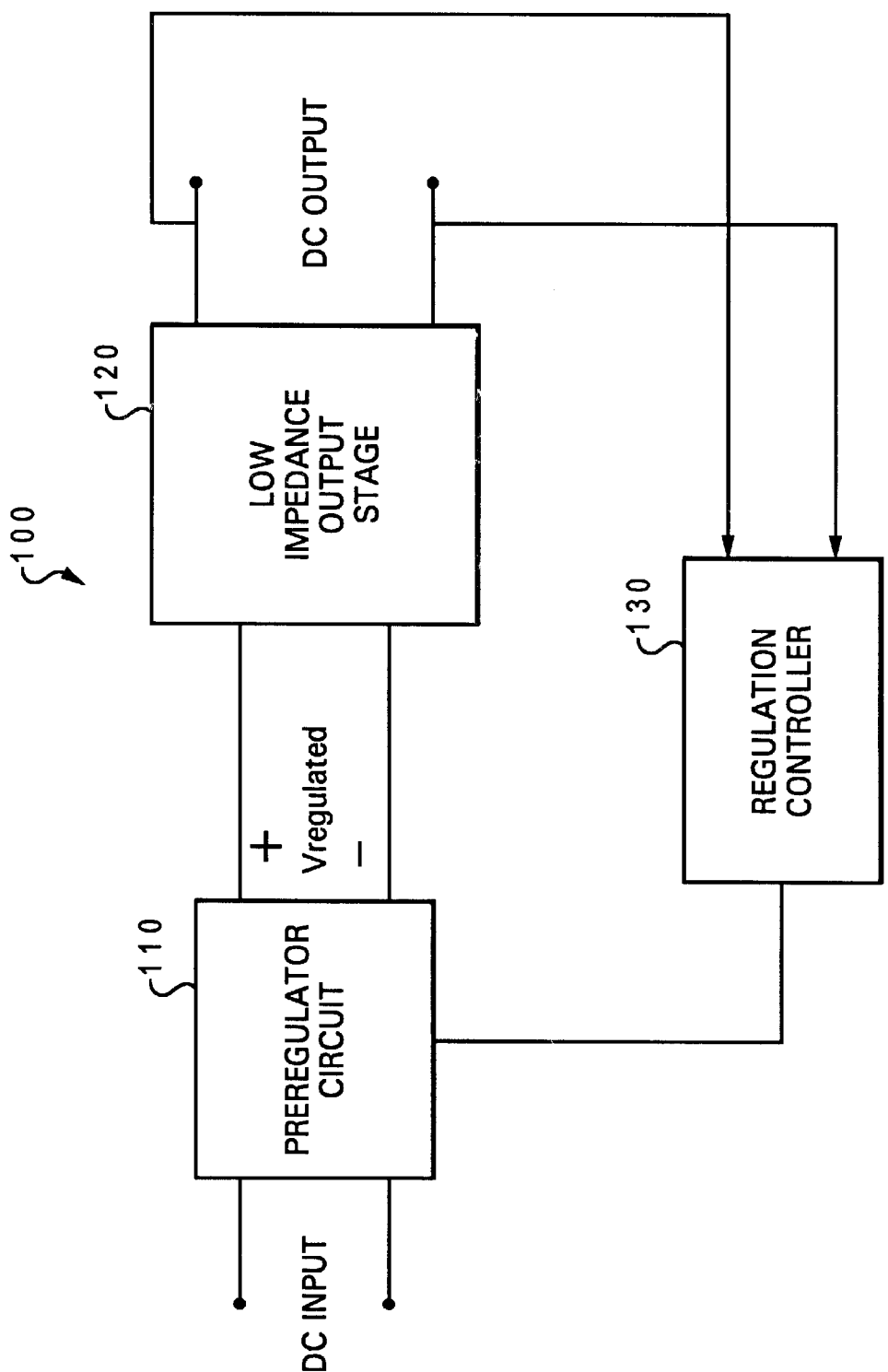
FIG. 1 illustrates a simplified block diagram of an embodiment of a high efficiency low output impedance DC/DC power converter according to the present invention.

As discussed previously, maintaining a regulated output bus voltage in a power system driving highly dynamic loads is a difficult endeavor. Utilizing decoupling capacitors at the load to manage the widely varying output load swings requires large capacitors that become unmanageable at low bus voltages. The problem can be alleviated by placing most of the decoupling at an intermediate stage having a higher voltage level and coupling it through an output stage DC/DC converter with very low input to output impedance. Furthermore, to achieve the best In possible coupling between the intermediate stage and the load, a DC/DC power converter should be operated at nearly full duty cycle and have minimum inductance in the high current paths. However, a full duty cycle DC/DC power converter cannot provide voltage regulation since it is essentially a DC transformer, a DC/DC preregulator is required to sense the load voltage and regulate an intermediate voltage level to compensate for variations in input voltage, component drift and long term load changes. A simplified block diagram of an embodiment of a high efficiency low output impedance DC/DC power converter 100 according to the present invention is depicted in FIG. 1. As illustrated, power converter 100 includes a preregulator circuit 110 coupled to a source of input DC power that provides a regulated intermediate voltage Vregulated to a low impedance output stage 120. A regulation controller 130, such as a pulse-width-modulation (PWM) controller, is utilized to sense the DC output voltage of low impedance output stage 120 and provides control signals to maintain the voltage at the output of preregulator circuit 110 at a predetermined level. The construction and operation of a PWM controller is well-known in the art and will not be described in greater detail herein.

Figure 2:
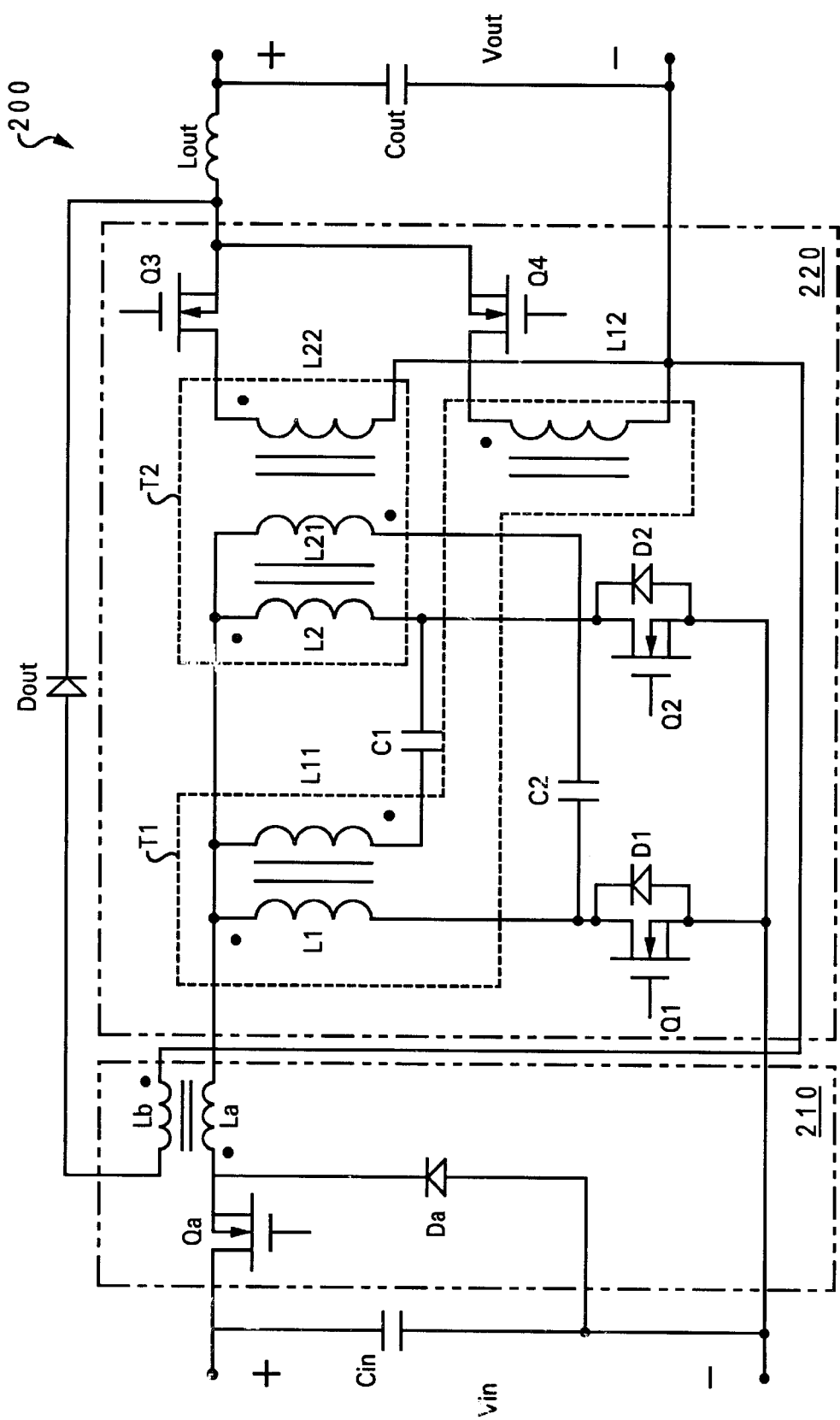
FIG. 2 illustrates a schematic diagram of an embodiment of a high efficiency power converter (analogous to the power converter depicted in FIG. 1) according to the principles disclosed by the present invention.

Referring now to FIG. 2, there is illustrated a schematic diagram of an embodiment of a high efficiency power converter 200 (analogous to power converter 100 depicted in FIG. 1) according to the principles disclosed by the present invention. As shown in the illustrated embodiment, high efficiency power converter 200 includes a preregulator circuit 210 coupled to a low impedance output stage 220. Preregulator circuit 210 includes a regulator switching device Qa coupled to an input capacitor Cin that is coupled across an input DC voltage source Vin. Preregulator circuit 210 also includes a regulator diode Da that is coupled in parallel across input capacitor Cin and a regulator inductor La. Switching device Qa, in an advantageous embodiment, is a field effect transistor (FET) and is operationally controlled by a switching control signal from a regulation circuit (not shown), such as regulation controller 130 depicted in FIG. 1, to provide a regulated intermediated DC voltage to output stage 220. When switching device Qa is turned ON, i.e., conducting, regulator diode Da is reversed biased and does not conduct and the voltage across regulator diode Da is equal to input voltage Vin. Conversely, when switching device Qa is turned OFF, i.e., not conducting, regulator diode Da now becomes forward biased and proceeds to conducts. Regulator inductor La acts as a filter to minimize the switch ripple resulting from switching device Qa switching frequency. A coupling inductor Lb is coupled across regulator inductor La and is utilized to divert any remaining energy in regulator inductor La via an output diode Dout to an output capacitor Cout when the switches in low impedance output stage 220, which will be described in greater detail hereinafter, are turned off. This, in turn, will reduce the output ripple current and improve the transient response of power converter 200.

The design of low impedance output stage 220 presents some challenges. Employing full wave single transformer topologies, such as push-pull, half or full-bridge, require almost perfect volt time balance between the halves of the operating cycle to keep the magnetic flux in the transformer centered. If balance is not maintained, the transformer core can saturate, resulting in the failure of the power converter. Current mode control, which is the commonly utilized method of transformer core balancing in a push-pull or full-bridge power converter, is undesirable because it requires current sensing, feedback control and dead time adjustment, all of which indirectly increases the impedance of the power converter. In the case of the half-bridge topology, which does not require external transformer's magnetic flux balancing, the capacitor divider circuit at its input adds impedance and greatly increases the size of the power converter. For single-ended converter designs utilizing a single power train, long dead times are required to reset the transformer core necessitating substantial output filtering that, in turn, results in higher impedance.

To overcome the above-described deficiencies in the prior art converter topologies, low impedance output stage 220 includes first and second power transformers T1, T2 coupled to preregulator circuit 210. First power transformer T1 includes first and second primary windings L1, L11 that are of opposite polarities and a secondary winding L12. Second power transformer T2 also includes first and second primary windings L2, L21, which are also of opposite polarities, and secondary winding L22. The power transformers should be tightly coupled to reduce leakage inductance and, in an advantageous embodiment, have equal turn ratios in their primary windings, i.e., L1=L11=L2=L21. Additionally, the turn ratios of first and second power transformers' T1, T2 secondary windings are also equal, i.e., L12=L22.

A first coupling capacitor C1 connects a terminal of first power transformer's T1 second primary winding L11 to second power transformer's T2 first primary winding L2. A second coupling capacitor C2 is similarly utilized to couple first power transformer's T1 first primary winding L1 to second power transformer's T2 second primary winding L21. Low impedance output stage 220 also includes first and second switches Q1, Q2 that are coupled to first and second power transformers' T1, T2 first primary windings L1, L2 and are operationally utilized to alternatively couple first and second power transformers T1, T2 to an input DC waveform, i.e. regulated intermediate voltage from preregulator circuit 210. Thus, in an advantageous embodiment, first and second switches Q1, Q2 are operated complementarily with constant frequency rectangular waveforms with duty cycles of about 50%, preferably in the range of 47% to 49%. Also shown in the illustrated embodiment are first and second antiparallel diodes D1, D2 that are coupled across first and second switches Q1, Q2, respectively. First and second switches Q1, Q2, in an advantageous embodiment, are field effect transistors (FETs), such as metal oxide semiconductors FETs (MOSFETs) with their corresponding internal body diodes, i.e., first and second antiparallel diodes D1, D2. In another advantageous embodiment, other switching devices, such as insulated gate bipolar transistors (IGBTs), may also be advantageously employed.

Third and fourth switches Q3, Q4 are also depicted coupled to the secondary windings of first and second power transformers T1, T2. It should readily apparent to those skilled in the art that, alternatively, diodes may also be utilized in place of third and fourth switches Q3, Q4 to couple the secondary windings of first and second transformers T1, T2 to output capacitor Cout. Third and fourth switches Q3, Q4 are similarly driven as with second and first switches Q2, Q1, respectively. Thus when first switch Q1 is turned ON, i.e., conducting, fourth switch Q4 is also turned ON to deliver the energy in first transformer T1 to an output load (not shown). Similarly, when second switch Q2 is conducting, third switch Q3 is also turned ON to couple second transformer T2 to the output load. In this manner, energy is transferred to the load during each half cycle from either the first or second power transformer T1, T2, thereby providing high output current and increased efficiency. Furthermore, as shown in the illustrated embodiment, a small output inductor Lout may be advantageously situated at the output to improve the transient response of power converter 200.

When first switch Q1 is turned ON, i.e., conducting, a voltage, i.e., regulated intermediate voltage Vregulated, is impressed across first primary winding L1 of first power transformer T1. The magnetizing inductance in first power transformer T1 controls the slope of the magnetizing current flowing in the primary windings and of the magnetizing energy that accumulates in the transformer core. At this time, second primary winding L11 is inoperative since second switch Q2 is not conducting, i.e., turned OFF. The drain current through first switch Q1 is equal to the current through first primary winding L1 and the current through second coupling capacitor C2 which is being charged. Since fourth switch Q4 is also been turned ON, the magnetizing energy in first power transformer T1 is transferred to secondary winding L12 to the output load. It should be noted that before first switch Q1 turns ON, second coupling capacitor C2 is discharged and the drain voltage across first switch Q1 is substantially zero, thus minimizing switching losses when first switch Q1 is turned ON, i.e., zero voltage switching (ZVS). When first switch Q1 is turned OFF, second primary winding L21 of second power transformer T2 is utilized to reset the magnetic flux in first power transformer T1 to zero by recycling the remaining magnetizing energy present in first power transformer in second coupling capacitor C2 without generating any significant thermal losses.

Similarly, when second switch Q2 is turned ON, the drain current through second switch Q2 is equal to the current through first primary winding L2 of second power transformer T2 and the current through first coupling capacitor C1. As with first switch Q1, before second switch Q2 is turned ON, first coupling capacitor C1 is discharged and the drain voltage across second switch Q2 is substantially zero, resulting in ZVS. The magnetizing energy in second power transformer T2 is transferred to the output load via third switch Q3, which is also driven in a similar fashion as second switch Q2. Second primary winding L11 of first power transformer T1 is utilized to reset second power transformer T2 core by recycling the magnetizing energy through first coupling capacitor C1. It should be noted that utilizing first and second coupling capacitors C1, C2 to charge and discharge the magnetizing currents of first and second power transformers T1, T2 results in a more efficient power converter since the magnetizing energy is being "saved" in the capacitors instead of being dissipated as heat. Furthermore, since first and second coupling capacitors C1, C2 are part of the drain currents for both first and second switches Q1, Q2, first and second switches Q1, Q2 require less current from preregulator 210, thereby increasing the overall efficiency of the power converter.

While the invention has been particularly shown and described with reference to a preferred embodiment, it will be understood by those skilled in the art that various changes in form and detail may be made therein without departing from the spirit and scope of the invention.

What is claimed is:

1. A high efficiency power converter, comprising:
   a preregulator circuit, couplable to a source of DC power, that provides a regulated intermediate DC voltage, wherein said preregulator circuit includes:
   a regulator switching device coupled to said source of DC power; and
   a regulator inductor, coupled to said preregulator switching device; and
   a low impedance output stage, coupled to said preregulator circuit, including:
   first and second power transformers, wherein each of said first and second power transformers having first and second primary windings of opposite polarity and a secondary winding;
   first and second switches that alternatively couple said first primary windings of said first and second power transformers, respectively, to said intermediate DC voltage; and first and second coupling capacitors that couple said second primary windings of said first and second power transformers to said second and first switches, respectively, to reset said first and second power transformers with minimum losses.

2. The high efficiency power converter as recited in claim 1, wherein said preregulator circuit further includes:

a coupling inductor, coupled to said regulator inductor, that diverts energy in said regulator inductor to an output of said high efficiency power converter when both of said first and second switches are not conducting.

3. The high efficiency power converter as recited in claim 2, wherein said preregulator circuit further includes:

a regulator diode coupled to said regulator switching device and said regulator inductor; and an output diode that couples said coupling inductor to said output of said high efficiency power converter.

4. The high efficiency power converter as recited in claim 1, wherein said first and second switches and regulator switching device are Field Effect Transistors (FETs).

5. The high efficiency power converter as recited in claim 1, wherein said first and second switches are driven in a complementary manner.

6. The high efficiency power converter as recited in claim 5, wherein each of said first and second switches having a substantially 50% duty cycle.

7. The high efficiency power converter as recited in claim 5, wherein each of said first and second switches is operated with a duty cycle ranging from about 47% to about 49%.

8. The high efficiency power converter as recited in claim 1, wherein said low impedance output stage further comprises third and fourth switches that are coupled to said secondary windings of said second and first power transformers, respectively.

9. The high efficiency power converter as recited in claim 8, wherein said third and fourth switches are driven in a substantially identical manner as said second and first switches, respectively.

10. The high efficiency power converter as recited in claim 1, wherein said low impedance output stage further includes first and second diodes coupled in parallel with said first and second switches, respectively.

11. The high efficiency power converter as recited in claim 1, further comprising input and output capacitors.

12. The high efficiency power converter as recited in claim 1, wherein said regulator switching device is controlled by a pulse width modulation (PWM) controller.

13. The high efficiency power converter as recited in claim 1, further comprising an output inductor.

14. A method for providing a high efficiency power converter with low output impedance, comprising:

receiving DC input power into a preregulator circuit having a regulator switching device coupled to a regulator inductor, said preregulator circuit processing said DC input power into a regulated intermediate DC voltage;

energizing first primary windings of first and second power transformers in an output stage of said power converter by alternatively coupling first primary windings of said first and second power transformers to said regulated intermediate DC voltage; and resetting said first and second power transformers utilizing first and second coupling capacitors that couple second primary windings of said first and second power transformers to second and first switches, respectively, said first and second coupling capacitors charging and discharging magnetizing currents of said first and second power transformers with minimum losses.

15. The method as recited in claim 14, further comprising diverting energy in said regulator inductor to an output of said high efficiency power converter when both of said first and second switches are not conducting.

16. The method as recited in claim 14, wherein said first and second switches are driven in a complementary manner.

17. The method as recited in claim 16, wherein each of said first and second switches having a substantially 50% duty cycle.

18. The method as recited in claim 14, further comprising driving third and fourth switches that are coupled to secondary windings of said second and first power transformers, respectively, in a substantially identical manner as said second and first switches, respectively.

19. The method as recited in claim 14, wherein said first and second switches and said regulator switching device are Field Effect Transistors (FETs).

20. The method as recited in claim 14, further comprising communicating power through first and second diodes coupled in parallel with said first and second switches, respectively.

* * * * *